United States Patent [19]

Kramer et al.

[11] 4,303,955

[45] Dec. 1, 1981

[54] APPARATUS FOR SECURING AND RELEASING TAPE CARTRIDGES FROM TAPE DECKS

[75] Inventors: Joel Kramer, Woodbury; William D. Cohen, Huntington, both of N.Y.

[73] Assignee: North Atlantic Industries, Inc., Hauppauge, N.Y.

[21] Appl. No.: 124,576

[22] Filed: Feb. 25, 1980

[51] Int. Cl.³ .................... G11B 5/78; G11B 23/04
[52] U.S. Cl. .................... 360/93; 360/96.5; 242/198
[58] Field of Search .............. 360/96.6, 96.5, 90, 360/93, 137; 242/197–199, 55, 19 A

[56] References Cited

U.S. PATENT DOCUMENTS

| | | | |
|---|---|---|---|
| 3,485,500 | 12/1969 | Loeschner et al. | 360/93 |
| 3,684,299 | 8/1972 | Clark | 360/93 |
| 3,684,300 | 8/1972 | Clark | 360/93 |
| 3,863,267 | 1/1975 | Yasukatsu | 242/198 |
| 3,867,720 | 2/1975 | Tanaka | 360/93 |
| 4,199,795 | 4/1980 | Hunter | 360/137 |

Primary Examiner—Alfred H. Eddleman
Attorney, Agent, or Firm—Eisenman, Allsopp & Strack

[57] ABSTRACT

There is disclosed a tape deck for receiving standardized tape cartridges for data interchange in which the cartridge is accurately positioned by the combination of the forward thrust of a pair of resiliently biased pivot plates working in the notches of the cartridges and the resilient upward thrust of a leaf spring, with the cartridge near the plane of the interface of the recording head with the tape, having precision reference bearing points engaging complementary positioning pins anchored in the deck. The pair of pivot plates are restrained to remain in phase by means of a cross-coupling linkage and means are provided for the automatic ejection of the cartridges.

10 Claims, 6 Drawing Figures

APPARATUS FOR SECURING AND RELEASING TAPE CARTRIDGES FROM TAPE DECKS

This invention relates to tape deck apparatus for receiving and positioning for data interchange standardized tape cartridges in which the cartridges are gripped in the deck at their side edges.

BACKGROUND OF THE INVENTION

The evolution of tape as the storage medium for various types of data has resulted in a standardized tape cartridge design in which the leading edge of the cartridge exposes a driven capstan for operating the tape reels within the cartridge and a recording area in which the tape is exposed to the recording head. Certain parts of the casing of the cartridge are formed with dimensional precision to enable the cartridge to be accurately positioned so that the recording head sees exact lateral positions on the tape and so that driving engagement can be established by the capstans. The edges of cartridges are notched to accommodate latching means which now take the form of more or less independent latches working at both edges of the cartridge. The latching mechanism of the deck and the complementary reference points to be engaged by the cartridge for accurate positioning have taken a variety of forms in the prior art involving different directions of thrust on the cartridge and a variety of reference position points.

The present invention represents a further improvement in the latching and positioning means and, in particular, embodies apparatus by means of which the otherwise independently operable latches at either side of the cartridge are maintained in phase.

SUMMARY OF THE INVENTION

The present invention has for one of its objects to provide simplified latching and positioning mechanism for the cartridges which is capable of maintaining error-free operation over many cycles and under severe conditions. In accordance with the invention, there is provided latch structure in the form of a pair of independently pivoted plates, each having a pair of circumferentially spaced arms which project into the space passed by the edges of the cartridge in the process of insertion. Each pivot plate is resiliently biased by a toggle spring and is so arranged that the leading edge of the cartridge first engages one arm of the plate to establish pivotal motion against the toggle, causing the second arm to swing into position into the notched edge of the cartridge, thus thrusting the cartridge forwardly to bring the driving and driven capstans into engagement. When the cartridge is ejected, the pivot plates swing in the reverse direction to resume their receiving position. The two swinging plates are constrained to maintain the same phase relationship by means of a cross-link, the free ends of which are preferably made part of the toggle linkage. Accurate referencing of the recording head laterally with respect to the tape is achieved by providing precision reference pins located close to the plane of the interface between the tape and the recording head and adapted to be engaged by precision reference points formed on conventional tape cartridges with the lateral thrust urging the cartridge into engagement with the reference pins being derived from a leaf spring aligned with the direction of cartridge insertion and arching upwardly into the space eclipsed by the cartridge to bear against its side face. Ejection mechanism is provided in the form of a push rod coupled through a pivoted link to a draw bar which is engaged by the inserted cartridge to cause the push rod to extend out from the tape deck into the view of the operator. Thus, the operator is able to visually determine when the cartridge is fully home and is able by pushing the rod to eject the cartridge.

THE PREFERRED EMBODIMENT

Figure 1:
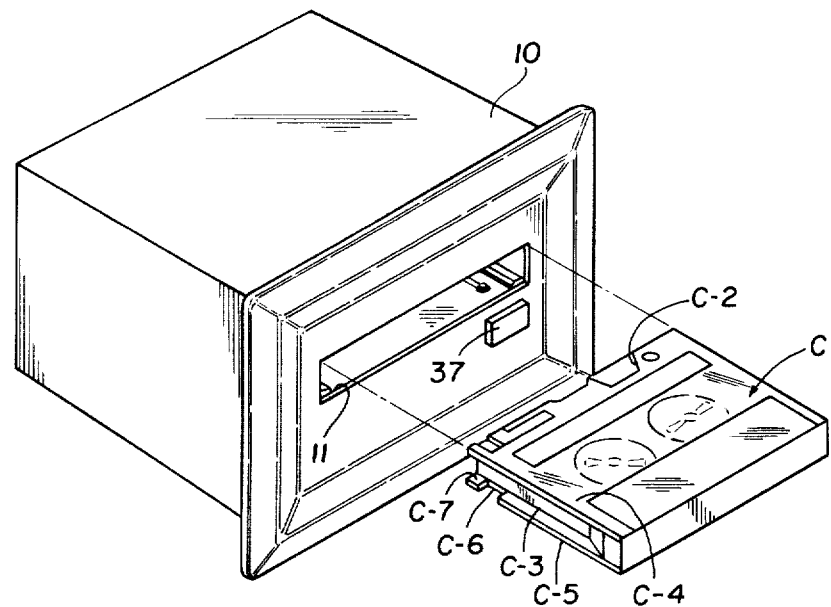
FIG. 1 is a view in perspective of the exterior of a tape deck assembly and showing a standard tape cartridge in position for insertion into the deck.
Figure 2:
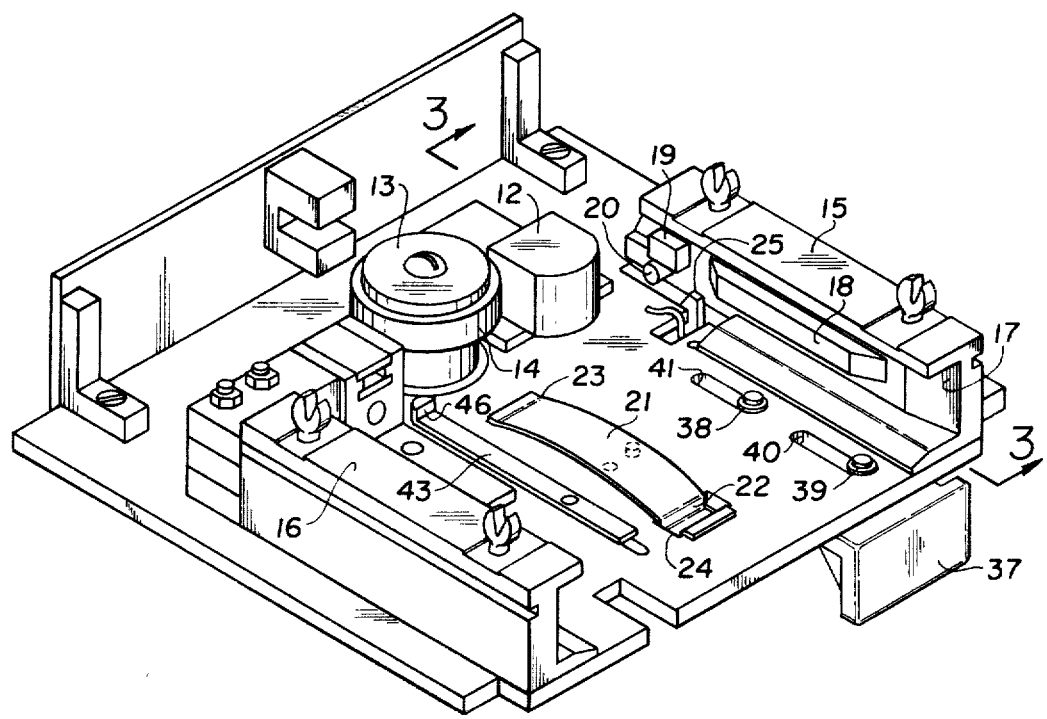
FIG. 2 is a view in perspective of the upper side of the interior of the tape deck showing details of the cartridge-receiving slot.

Referring to FIG. 1, there is shown a tape deck 10, the normally exposed front face of which is formed with a slot 11 adapted to receive a standard tape cartridge C containing a pair of tape reels between which the tape moves under the driving force of a driven capstan C-1 (not shown in FIG. 1 but identified in FIG. 4 by phantom lines) located near the leading edge of the cartridge. Also located near the leading edge of the cartridge is a tape access recess C-2 adapted to mate with a recording head 12 (FIG. 2). Each side edge of the cartridge is formed with a guide channel C-3 defined by lateral extensions of the top and bottom plates C-4 and C-5 of the cartridge housing. The lower plate extension C-5 is formed near the forward edge with latching notches C-6, and the upper surface C-7 of the bottom extension C-5 is precisely dimensioned to effect accurate lateral positioning of the tape and the recording head by means described below.

Figure 4:
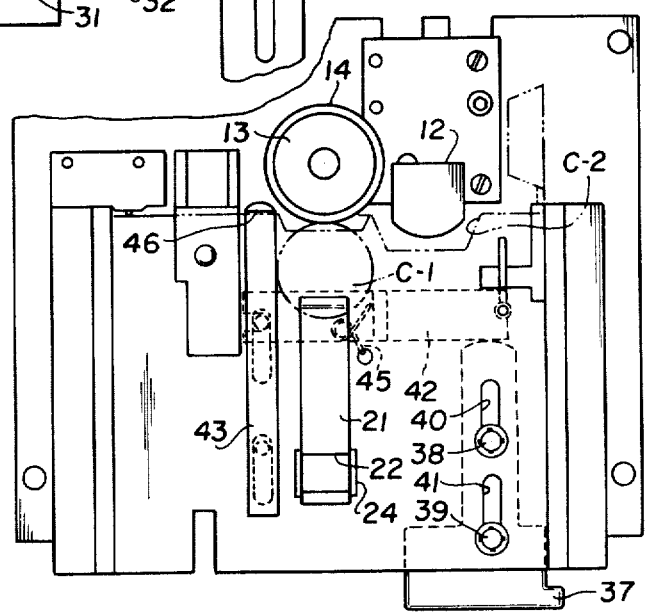
FIG. 4 is a plan view of the interior of the tape deck with the cartridge in place and showing the drive and driven capstans in engagement and the cartridge-ejection linkage primed for operation.

Referring to FIGS. 2 and 4, the slot chamber into which the cartridge is inserted includes, in addition to the recording head 12, a drive capstan 13 directly coupled to a motor (not shown) and having as its driving surface a slightly resilient friction ring 14. The left and side members 15 and 16 are mirror-image duplicates of each other and are formed with inwardly opening channels 17, the height of which establishes loose clearance with the upper and lower faces of the cartridges, with the total lateral spacing between the two channels slightly exceeding the width of the cartridge. Centrally disposed within each channel is a guide rib 18 and disposed forwardly of the rib is a stop block 19 beneath which is disposed a reference bearing member 20 in the form of a machined pin solidly anchored in the frame.

Mounted in the floor of the slot chamber is a leaf spring 21 anchored at its outer end 22 beneath the plane of the chamber, with its center portion arching upwardly into the chamber and with its inner end 23 slidably engaging the bottom surface. The spring 21 can be secured in a clip mounting in a square recess 24.

Figure 3A:
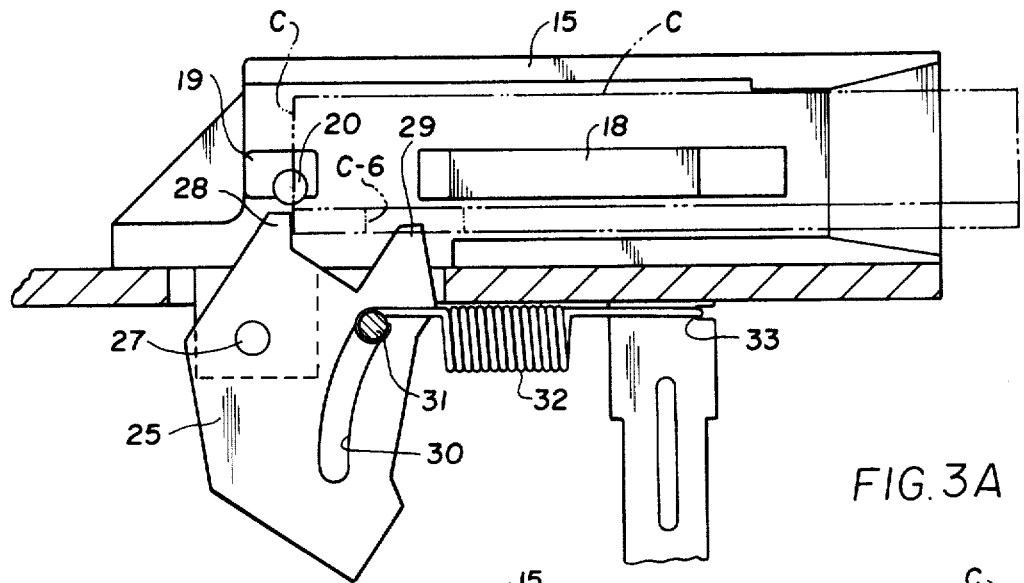
FIG. 3A is a view in cross-section of the interior of the tape deck showing the interaction between the cartridge (in phantom lines) and the pivot plate latching means as the cartridge is about to be brought under the control of the latching means and driven home.
Figure 3B:
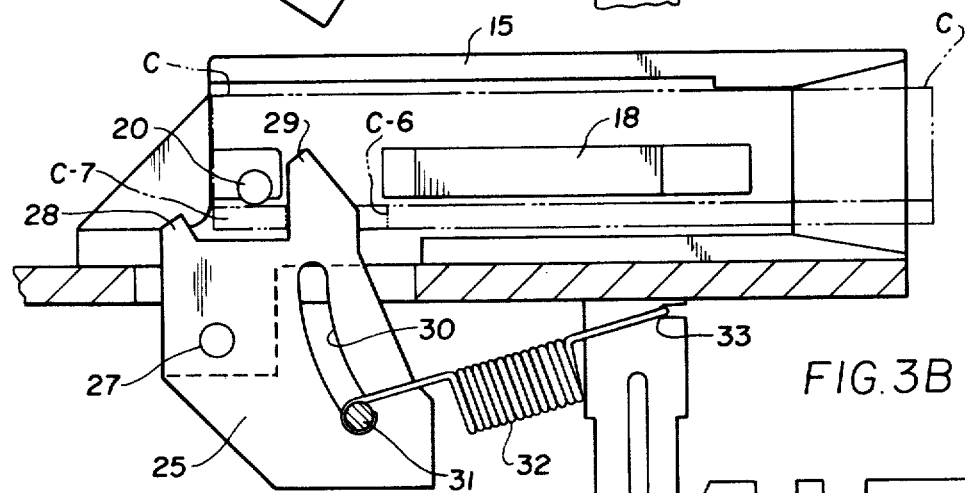
FIG. 3B is the same view as FIG. 3A, but showing the cartridge in its fully home position.

Pivotally mounted beneath the floor of the slot chamber are a pair of pivot plates 25 and 26 (seen in various views in FIGS. 2, 3A, 3B and 5). As best seen in FIGS. 3A and 3B, the pivot plate 25 is pivotally mounted to the frame in a pivot 27, the axis of which is disposed below the lower surface of the cartridge chamber. A pair of circumferentially spaced arms 28 and 29 extend upwardly into the chamber to encroach upon the path of travel of the cartridge. Each pivot plate is formed with an arcuate slot 30 which receives a slide pin 31 caught by one end of a tension spring 32 anchored to the frame at 33. In the view of FIG. 3A, the cartridge C is in the process of being inserted into its chamber with the rib 18 having afforded preliminary loose guidance and with the leading edge having engaged the arm 28, causing slight rotation of the pivot plate which has brought the arm 29 upwardly into the notch C-6 of the bottom plate of the cartridge. The spring 32 has been partly extended. In FIG. 3B, the cartridge C is fully home with the slot 30, pin 31 and spring 32, which constitute a toggle linkage, being over-centered with the spring first extending and then contracting to drive the pivot plate in a counterclockwise direction and to slide the pin 31 to the bottom of its slot 30, at which point the tension of the spring is imparted to the edge of the slot C-6 through the arm 29 which is now fully received in the slot and extends upwardly into the open space between the rib 18 and the stop block 19.

As the cartridge is pressed into the slot, it first engages the leaf spring 21 on its underside which urges it upwardly toward the upper surface of the chamber, with the spring flattening as required to achieve easy movement. This upward pressure continues as the pivot plate 25 turns in a clockwise direction during which, due to its angle, it imparts additional upward forces on the cartridge at the time of the toggling-over action. As the cartridge C reaches its fully home position, the reference point C-7 is in sliding contact with the reference pin 20 of the tape deck, a condition which is maintained by a combination of the upward thrust of the leaf spring 22 and the action of the swinging arm 29 of the pivot plate 25. At the fully home position, as shown in FIG. 3, the arm 29 is driving the cartridge horizontally forward against the stop afforded by the drive capstan 13 in engagement with the driven capstan C-1 of the cartridge. Thus, the cartridge is held in position by a combination of the lateral thrust of the pivot plate and the vertical thrust of the spring.

Figure 5:
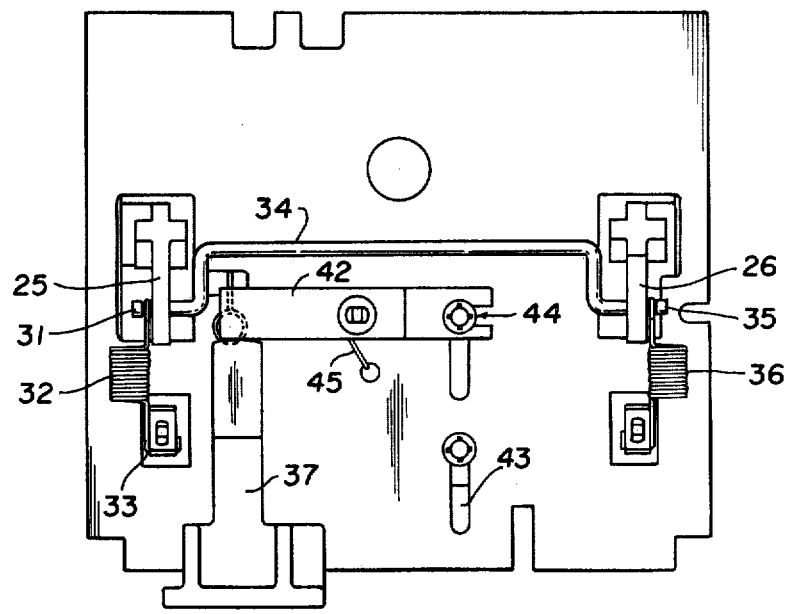
FIG. 5 is a plan view of the interior of the underside of the tape deck showing the cross connection linkage between pivot plates which locks the cartridge in place.

As thus far described, the action on the two pivot plates is independent, that is, it is possible for one pivot plate to become out of phase with the other. In accordance with the invention, the two pivot plates 25 and 26, as best seen in FIG. 5, are cross-connected by a link 34. The free ends 31 and 35 of the link 34 are received in the arcuate slots of the respective pivot plates 25 and 26 and constitute the slide pins to which the tension springs 32 and 36 are connected. Preferably, the pins 31 and 35 are recessed to receive the curved end of the spring and to prevent the spring from slipping off the end. The major portion of the line 34 is offset from the axis of the pins 31 and 35 to allow freedom of motion in which the link 34 can rotate in limited amounts within its confines to assist in breaking friction at the time of initial sliding of the pins and to allow the link to operate free of other parts of the apparatus.

Ejection means is provided in the form of a push rod 37 shown extended outwardly in FIG. 4, in which the cartridge is fully home, thus indicating to the operator that the cartridge is accurately positioned. The push rod is guided for rectilinear motion by guide pins 38 and 39 received in slots 40 and 41 respectively in the frame. A swinging link 42 is engaged near one end by the push rod 37, with the opposite end of the swinging link 42 being coupled to a draw bar 43 through a pin and slot connection 44 (FIG. 5). The swinging link is biased by a spring 45 to urge the push rod inwardly and the draw bar outwardly when the cartridge is not in position. The forward end 46 of the draw bar constitutes an upstanding finger which is engaged by the leading edge of the cartridge when it is drawn into position, with the final motion of the cartridge causing the swinging link to move the push rod 37 outwardly, in which position the operator is able to press it inward to effect ejection of the cartridge. When the cartridge ejects, the stop block 19 will first engage the upstanding arm 29, causing the pivot plate 25 to swing in a clockwise direction, as viewed in FIGS. 3A and 3B. As the cartridge continues outward, the spring toggle linkage 30, 31 and 32 will be activated to snap from its position of FIG. 3B to that of FIG. 3A, thus conditioning the system to receive a new cartridge. In this ejection action, as well as in the insertion action of the cartridge, the cross-linkage 34 which is part of both of the toggle linkages on both sides of the cartridge, imparts cross-coupling forces which assure that at no time can pivot plates 25 and 26 be toggled out of phase rendering the apparatus inoperative.

While the invention has been described with reference to a preferred embodiment thereof, it will be understood that it can take other forms without departing from the scope of the invention which would not, therefore, be limited except as defined in the following claims:

We claim:

1. Tape deck apparatus for receiving and positioning for data interchange standard tape cartridges housing tape reels and in which the leading edge includes a driven capstan to engage a driving capstan in the deck, and a tape exposing area to be brought into precision engagement with a recording head in the deck, the side edges carrying guide channels and latching notches, and reference bearing points adjacent the respective side edges of the cartridge for locating the tape in precise lateral position with respect to the recording head, the invention comprising:

means defining a slot chamber in the deck to receive the cartridge including edge guides to engage the respective side channels of the cartridge for loose sliding movement;

a pair of reference bearing members to be engaged by the reference bearing points of the cartridge when the cartridge is seated;

resilient means to engage one side of the cartridge to urge it in a direction normal to the plane thereof and against the reference bearing members; and latch means to engage the cartridge in the said notches to force it forwardly to bring the driving and driven capstans into engagement, said latch means comprising a pair of pivot plates in the path of movement of the guide channels of the cartridge, said pivot plates being independently pivotally coupled to the tape deck, and link means to cross-couple the pivot plates, whereby the pivot plates are constrained to remain in phase upon insertion and withdrawal of the cartridge.

2. Apparatus as set forth in claim 1, said reference bearing members on the tape deck comprising a pair of positioning pins extending laterally into the path of movement of the cartridge and disposed forwardly of said notches close to the plane of the interface between the tape and the recording head.

3. Apparatus as set forth in claim 2, said side channels of the cartridge comprising lateral extensions of the top and bottom planes thereof, said reference bearing points on the cartridge comprising the upper surface of the lateral extension of the bottom plane of the cartridge.

4. Apparatus as set forth in claim 1, said resilient means to urge the cartridge in a direction normal to the plane thereof comprising a bowed leaf spring disposed in alignment with the direction of insertion, the outer end of the spring being fixed to the tape deck below the bottom plane of the cartridge and the inner end being adapted to slidably engage the tape deck, with the center portion arching upward into the path of insertion of the cartridge to press upward against the underside of the cartridge.

5. Apparatus as set forth in claim 1, said pivot plates being mounted on aligned pivot axes perpendicular to the direction of insertion of the cartridge and below the guide channels thereof and including first and second circumferentially spaced apart arms adapted to project upwardly into the path of the cartridge, and toggle spring means to engage the respective pivot plates to urge the plates in a counterclockwise direction at one extreme of pivotal movement and clockwise at the other, one of said arms being adapted to be engaged by the forward edge of the cartridge upon insertion to be rotated toward the opposite extreme, the second arm being adapted to be received in the said notches to urge the cartridge forwardly to maintain driving and driven capstan contact.

6. Apparatus as set forth in claim 2, said toggle spring means comprising two toggle spring assemblies, each comprising a tension spring coupled at one end to the tape deck and the other to the pivot plate, each of said plates being formed with a slot extending above and below the pivot point of the plate, and a slide pin received in the slot and coupled to the said tension spring.

7. Apparatus as set forth in claim 6, said link means cross-coupling the two pivot plates including the slide pins which extend into the respective slots.

8. Apparatus as set forth in claim 7, said link means including a cross-piece offset from the axes of the said slide pins.

9. Apparatus as set forth in claim 1, including ejection means to force the cartridge out of the tape deck.

10. Apparatus as set forth in claim 9, said ejection means including a push rod exposed near the cartridge slot, a spring-loaded pivot arm engaged by the inner end of the push rod, and a cartridge-engaging slide-arm coupled to the other end of the pivot arm and having an offset finger to engage the leading edge of the cartridge.

* * * * *